United States Patent
Sidelkovskiy et al.

(10) Patent No.: US 11,846,196 B2
(45) Date of Patent: Dec. 19, 2023

(54) AFTER-FAN SYSTEM WITH ELECTRICAL MOTOR FOR GAS TURBINE ENGINES

(71) Applicant: UNITED TECHNOLOGIES CORPORATION, Farmington, CT (US)

(72) Inventors: Dmitriy B. Sidelkovskiy, Ellington, CT (US); Pitchaiah Vijay Chakka, Avon, CT (US); Michael Winter, New Haven, CT (US); Daniel Bernard Kupratis, Wallingford, CT (US); Nathan L. Messersmith, South Windsor, CT (US)

(73) Assignee: RTX Corporation, Farmington, CT (US)

( * ) Notice: Subject to any disclaimer, the term of this patent is extended or adjusted under 35 U.S.C. 154(b) by 378 days.

(21) Appl. No.: 16/797,194

(22) Filed: Feb. 21, 2020

(65) Prior Publication Data
US 2021/0262359 A1 Aug. 26, 2021

(51) Int. Cl.
| | |
|---|---|
| *F01D 15/10* | (2006.01) |
| *B64D 27/10* | (2006.01) |
| *B64D 27/24* | (2006.01) |
| *B64D 41/00* | (2006.01) |
| *F01D 15/12* | (2006.01) |
| *F02C 6/06* | (2006.01) |
| *F02K 3/065* | (2006.01) |
| *H02K 7/116* | (2006.01) |

(Continued)

(52) U.S. Cl.
CPC ............ *F01D 15/10* (2013.01); *B64D 27/10* (2013.01); *B64D 27/24* (2013.01); *B64D 41/00* (2013.01); *F01D 15/12* (2013.01); *F02C 6/06* (2013.01); *F02K 3/065* (2013.01); *H02K 7/116* (2013.01); *H02K 7/1823* (2013.01); *H02K 7/20* (2013.01); *H02K 11/0094* (2013.01); *B64D 2027/026* (2013.01); *F05D 2220/50* (2013.01); *F05D 2220/76* (2013.01)

(58) Field of Classification Search
None
See application file for complete search history.

(56) References Cited

U.S. PATENT DOCUMENTS

| | | |
|---|---|---|
| 4,055,042 A | 10/1977 | Colley |
| 4,222,233 A | 9/1980 | Johnson et al. |

(Continued)

FOREIGN PATENT DOCUMENTS

| | | |
|---|---|---|
| EP | 0022692 | 1/1981 |
| EP | 2587026 | 5/2013 |

(Continued)

OTHER PUBLICATIONS

USPTO; Response to Non Final Office Action dated May 12, 2022 in U.S. Appl. No. 16/837,143.

(Continued)

*Primary Examiner* — Jason H Duger
(74) *Attorney, Agent, or Firm* — Snell & Wilmer L.L.P.

(57) ABSTRACT

An after-fan system for an engine may comprise an after-fan turbine an electrical generator operationally coupled to the after-fan turbine, and an electric motor electrically coupled to the electrical generator. The electrical generator may be configured to generate an electrical current in response to rotation of the after-fan turbine. The electric motor may be configured to generate torque.

15 Claims, 9 Drawing Sheets

(51) Int. Cl.
*H02K 7/18* (2006.01)
*H02K 7/20* (2006.01)
*H02K 11/00* (2016.01)
*B64D 27/02* (2006.01)

(56) References Cited

U.S. PATENT DOCUMENTS

| | | | | |
|---|---|---|---|---|
| 4,376,375 | A * | 3/1983 | Boudigues | F02K 3/075 60/226.3 |
| 5,261,227 | A * | 11/1993 | Giffin, III | F01D 17/162 60/226.3 |
| 5,587,647 | A * | 12/1996 | Bansal | H02K 17/42 290/31 |
| 6,082,967 | A * | 7/2000 | Loisy | F02C 7/36 416/129 |
| 6,895,741 | B2 * | 5/2005 | Rago | F02C 7/36 60/793 |
| 7,614,210 | B2 | 11/2009 | Powell et al. | |
| 8,324,746 | B2 * | 12/2012 | Bradbrook | F02C 3/10 290/1 A |
| 8,375,695 | B2 * | 2/2013 | Schilling | F01D 15/10 60/39.162 |
| 8,596,076 | B1 * | 12/2013 | Gritton | F02C 3/13 60/39.163 |
| 8,935,923 | B2 | 1/2015 | Kupratis | |
| 2009/0145106 | A1 | 6/2009 | Keogh | |
| 2011/0167792 | A1 | 7/2011 | Jphnson et al. | |
| 2013/0004297 | A1 | 1/2013 | Sheridan | |
| 2013/0104522 | A1 | 5/2013 | Kupratis | |
| 2016/0010589 | A1 | 1/2016 | Rolt | |
| 2016/0347463 | A1 | 12/2016 | Negulescu | |
| 2018/0118368 | A1 * | 5/2018 | Sands | B64D 27/24 |
| 2018/0201384 | A1 * | 7/2018 | Barth | B64D 31/06 |
| 2018/0328288 | A1 | 11/2018 | Lemarchand et al. | |
| 2018/0372588 | A1 | 12/2018 | Hon et al. | |
| 2019/0368424 | A1 | 12/2019 | Kupratis et al. | |
| 2019/0383157 | A1 | 12/2019 | Kupratis et al. | |
| 2020/0025070 | A1 | 1/2020 | Kupratis | |
| 2020/0325852 | A1 | 10/2020 | Sidelkovskiy et al. | |

FOREIGN PATENT DOCUMENTS

| | | |
|---|---|---|
| EP | 3315747 | 5/2018 |
| EP | 3722565 | 10/2020 |
| WO | 2011038216 | 3/2011 |
| WO | 2014152875 | 9/2014 |

OTHER PUBLICATIONS

European Patent Office, European Search Report dated Jun. 29, 2021 in Application No. 21157815.8.
USPTO, Restriction/election Requirement dated Feb. 18, 2022 in U.S. Appl. No. 16/837,143.
European Patent Office, European Search Report dated Aug. 18, 2020 in Application No. 20168376.0.
USPTO; Final Office Action Office dated Nov. 21, 2022 in U.S. Appl. No. 16/837,143.
USPTO; Advisory Action dated Feb. 13, 2023 in U.S. Appl. No. 16/837,143.
USPTO; Non-Final Office Action dated Mar. 10, 2023 in U.S. Appl. No. 16/837,143.
USPTO; Final Office Action dated Oct. 6, 2023 in U.S. Appl. No. 16/837,143.

* cited by examiner

AFTER-FAN SYSTEM WITH ELECTRICAL MOTOR FOR GAS TURBINE ENGINES

FIELD

The present disclosure relates to gas turbine engines, and, more specifically, to an after-fan system with electrical motor for gas turbine engines.

BACKGROUND

Gas turbine engines, such as those used to power modern commercial and military aircraft, typically include a fan section, a compressor section, a combustor section, and a turbine section. In general, during operation, air is pressurized in the fan and compressor sections and is mixed with fuel and burned in the combustor section to generate hot combustion gases. The hot combustion gases flow through the turbine section, which extracts energy from the hot combustion gases to power the compressor and fan sections and other gas turbine engine loads.

Typical gas turbine engines are designed such that peak operational efficiency occurs when the engine is operated during one or both of takeoff or top of climb (alternately referred to as climb out) conditions. During these conditions, the gas turbine engine utilizes maximum amounts of thrust output of all operational modes. The peak efficiency designs impact the size of the engine components and the temperatures at which the engine components run during each phase of engine operations. Since the typical gas turbine engine is designed for peak efficiency during takeoff or top of climb, where the turbine inlet temperature approaches its maximum allowable limit for highest efficiency and thrust, the gas turbine engine is operated at lower efficiencies during other modes, such as cruise, where the turbine inlet temperature is below the maximum allowable limit.

SUMMARY

An after-fan system for a gas turbine engine is disclosed herein. In accordance with various embodiments, the after-fan system may comprise an after-fan turbine, an electrical generator operationally coupled to the after-fan turbine and an electric motor electrically coupled to the electrical generator. The electrical generator may be configured to generate an electrical current in response to rotation of the after-fan turbine. The electric motor may be configured to generate torque.

In various embodiments, a gear assembly may be rotationally coupled to a mechanical output of the electric motor. In various embodiments, a fan input shaft maybe directly coupled to a mechanical output of the electric motor.

In various embodiments, a battery may be electrically coupled to an output of the electrical generator. In various embodiments, the battery may be electrically coupled to the electric motor.

In various embodiments, a controller may be electrically coupled to the electrical generator and the electric motor. The controller may be configured to receive the electrical current from the electrical generator and output an electrical signal to the electric motor. The electrical signal may be configured to cause the electric motor to generate torque. In various embodiments, an exit guide vane assembly may be located at an inlet of the after-fan turbine. In various embodiments, the exit guide vane assembly may comprise a variable exit guide vane assembly and the controller may be configured to control a stagger angle of the variable exit guide vane assembly.

A gas turbine engine is also disclosed herein. In accordance with various embodiments, the gas turbine engine may comprise a fan, a compressor aft of the fan, and an after-fan system located axially between the fan and the compressor. The after-fan system may comprise an after-fan turbine located forward of the compressor, a first electrical generator operationally coupled to the after-fan turbine and configured to generate a first electrical current in response to rotation of the after-fan turbine, and an electric motor electrically coupled to the first electrical generator and rotationally coupled to the fan.

In various embodiments, the after-fan system may further comprise a variable exit guide vane assembly located axially between the fan and the after-fan turbine.

In various embodiments, a turbine may be aft of the compressor. A shaft may be rotationally coupled to the turbine. A gear assembly may be coupled between the shaft and the fan. A mechanical output of the electric motor may be rotationally coupled to an input of the gear assembly.

In various embodiments, a turbine may be aft of the compressor. A shaft may be rotationally coupled to the turbine. A second electrical generator may be operationally coupled to the shaft and configured to generate a second electrical current in response to rotation of the turbine. The second electrical generator may be electrically coupled to the electric motor. In various embodiments, a gear assembly may be rotationally coupled between the shaft and the second electrical generator.

In various embodiments, a battery may be electrically coupled to the electric motor and to at least one of the first electrical generator or the second electrical generator.

In various embodiments, the electric motor may comprise at least one of an asynchronous 3-phase alternating current motor or a switch reluctance motor. In various embodiments, the first electrical generator may comprise an alternating current self-oscillation rotary generator.

An electric engine for an aircraft is also disclosed herein. In accordance with various embodiments, the electric engine may comprise a fan and an after-fan system located aft of the fan. The after-fan system may comprise an exit guide vane assembly located at an output of the fan, an after-fan turbine located aft of the exit guide vane assembly, an electrical generator operationally coupled to the after-fan turbine and configured to generate an electrical current in response to rotation of the after-fan turbine, and an electric motor electrically coupled to the electrical generator and rotationally coupled to the fan.

In various embodiments, a sensor may be operably coupled to the after-fan turbine. A controller may be electrically coupled to the electrical generator and the electric motor. The controller may be configured to receive the electrical current from the electrical generator and a signal corresponding to a rotations per minute of the after-fan turbine shaft from the sensor. The controller may output an electrical signal to the electric motor based on the signal corresponding to the rotations per minute of the after-fan turbine shaft.

In various embodiments, a battery may be electrically coupled to the electrical generator and to the electric motor. An alternating current to direct current convertor may be electrically coupled between the electrical generator and the battery.

In various embodiments, the exit guide vane assembly may be a variable vane assembly. The controller may be configured to control a stagger angle of the variable vane assembly.

BRIEF DESCRIPTION OF THE DRAWINGS

The subject matter of the present disclosure is particularly pointed out and distinctly claimed in the concluding portion of the specification. A more complete understanding of the present disclosure, however, is best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

Surface shading and cross hatching lines may be used throughout the figures to denote different parts but not necessarily to denote the same or different materials. Throughout the present disclosure, like reference numbers denote like elements. Accordingly, elements with like element numbering may be shown in the figures but may not necessarily be repeated herein for the sake of clarity.

As used herein, "aft" refers to the direction associated with the tail (i.e., the back end) of an aircraft, or generally, to the direction of exhaust of a gas turbine engine. As used herein, "forward" refers to the direction associated with a nose (i.e., the front end) of the aircraft, or generally, to the direction of flight or motion.

A first component that is "radially outward" of a second component means that the first component is positioned at a greater distance away from the engine central longitudinal axis than the second component. As used herein, the term "axially" refers to a direction parallel to the engine central longitudinal axis. As used herein, the term "circumferentially" refers to a direction about the engine central longitudinal axis.

Figure 1:
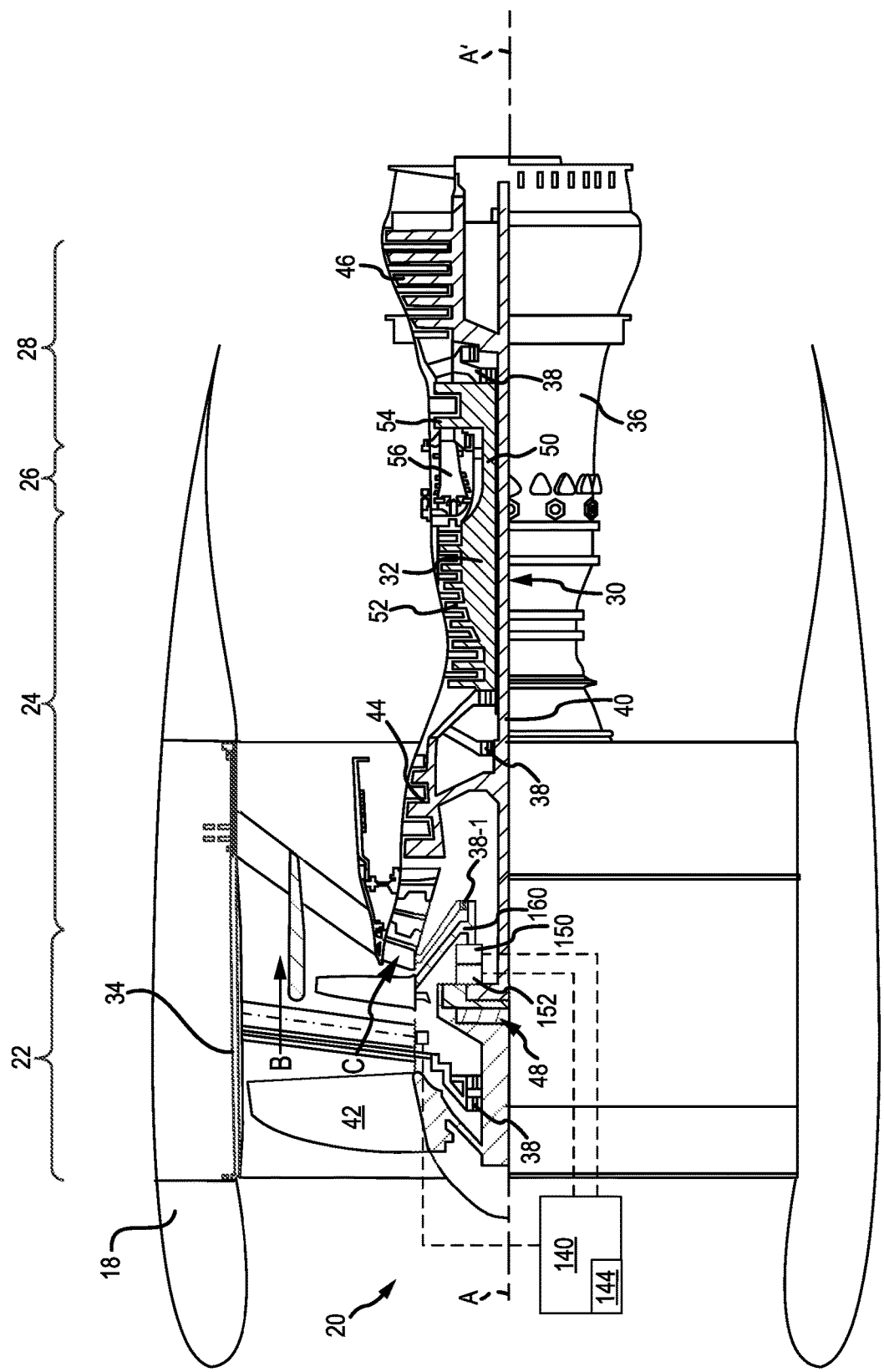
FIG. 1 illustrates a cross-section view of an exemplary gas turbine engine, in accordance with various embodiments.

In various embodiments and with reference to FIG. 1, a gas turbine engine 20 is provided. Gas turbine engine 20 may be a two-spool turbofan that generally incorporates a fan section 22, a compressor section 24, a combustor section 26, and a turbine section 28. In operation, fan section 22 can drive fluid (e.g., air) along a bypass flow-path B defined, at least partially, by a nacelle 18, and also along a core flow-path C for compression by compressor section 24 and communication into combustor section 26 then expansion through turbine section 28. Although depicted as a two-spool turbofan gas turbine engine herein, it should be understood that the concepts described herein are not limited to use with two-spool turbofans as the teachings may be applied to other types of turbine engines.

Gas turbine engine 20 may generally comprise a low speed spool 30 and a high speed spool 32 mounted for rotation about an engine central longitudinal axis A-A' relative to an engine static structure, or case, 36 via several bearing systems 38. It should be understood that various bearing systems 38 at various locations may be provided. In various embodiments, gas turbine engine 20 may include an after fan turbine spool 160 (also referred to as an after-fan turbine shaft) mounted for rotation about engine central longitudinal axis A-A' and relative to the engine static structure 36 via, for example, one or more bearing system(s) 38-1.

Low speed spool 30 may generally comprise an inner shaft 40 (also referred to as a low speed shaft) that interconnects a fan 42, a low pressure compressor (LPC) 44, and a low pressure turbine (LPT) 46. Low speed shaft 40 may be connected to fan 42 through a gear assembly 48 that can drive fan 42 at a lower speed than low speed spool 30. Gear assembly 48 rotationally couples low speed shaft 40 to fan 42, thereby transferring torque from inner shaft 40 to fan 42 and providing rotational force to fan 42. High speed spool 32 may comprise an outer shaft 50 (also referred to as a high speed shaft) that interconnects a high pressure compressor (HPC) 52 and high pressure turbine (HPT) 54. A rotations per minute (RPM) of high speed shaft 50 is generally greater than a RPM of low speed shaft 40. A fan case 34 may surround fan 42. Fan case 34 may be secured or mounted to nacelle 18.

A combustor 56 may be located between high pressure compressor 52 and high pressure turbine 54. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

The core airflow C may be compressed by low pressure compressor 44 then high pressure compressor 52, mixed and burned with fuel in combustor 56, then expanded over high pressure turbine 54 and low pressure turbine 46. Turbines 46, 54 rotationally drive respective low speed spool 30 and high speed spool 32 in response to the expansion. In various embodiments, the low pressure compressor 44, the high pressure compressor 52, the low pressure turbine 46, and the high pressure turbine 54 may comprise one or more stages or sets of rotating blades and one or more stages or sets of non-rotating vanes axially interspersed with the associated blade stages. It will be appreciated that each of the positions of the fan section 22, compressor section 24, combustor section 26, turbine section 28, and gear assembly 48 may be varied. For example, gear assembly 48 may be located aft of combustor section 26 or even aft of turbine section 28, and fan section 22 may be positioned forward or aft of the location of gear assembly.

Gas turbine engine 20 may be, for example, a high-bypass ratio geared aircraft engine. In various embodiments, the bypass ratio of gas turbine engine 20 may be greater than about six (6). In various embodiments, the bypass ratio of gas turbine engine 20 may be greater than ten (10). In various embodiments, geared architecture 48 may be an epicyclic gear train, such as a star gear system (sun gear in meshing engagement with a plurality of star gears supported by a carrier and in meshing engagement with a ring gear) or other gear system. Geared architecture 48 may have a gear reduction ratio of greater than about 2.3 and low pressure turbine 46 may have a pressure ratio that is greater than about five (5). In various embodiments, the bypass ratio of gas turbine engine 20 is greater than about ten (10:1). In various embodiments, the diameter of fan 42 may be significantly larger than that of the low pressure compressor 44, and the low pressure turbine 46 may have a pressure ratio that is greater than about five (5:1). The pressure ratio of low pressure turbine 46 may be the pressure as measured at the inlet of low pressure turbine 46 as related to the pressure at the outlet of low pressure turbine 46 prior to an exhaust nozzle. It should be understood, however, that the above parameters are exemplary of various embodiments of a suitable geared architecture engine and that the present disclosure contemplates other gas turbine engines including direct drive turbofans and low bypass engines. A gas turbine engine may comprise an industrial gas turbine (IGT) or a geared aircraft engine, such as a geared turbofan, or non-geared aircraft engine, such as a turbofan, or may comprise any gas turbine engine as desired.

Figure 2A:
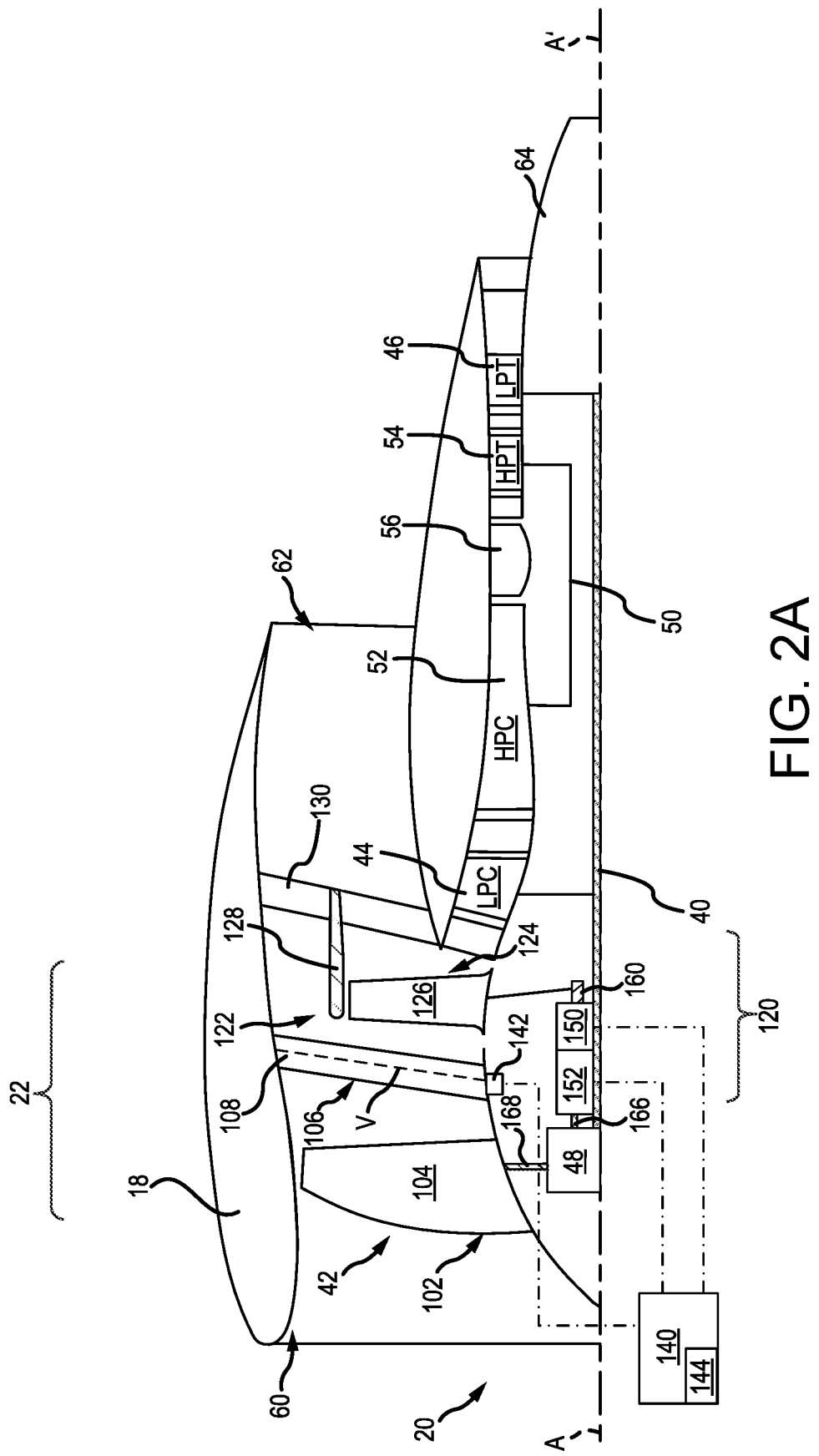
FIG. 2A illustrates a cross-section view of a gas turbine engine having an after-fan system with electric motor, in accordance with various embodiments.

With reference to FIG. 2A, components of fan section 22 are depicted in greater detail. Fan 42 may include one or more rotor assemblies (stages) 102. Rotor assemblies 102 may each comprise a plurality of blades 104 configured to rotate about engine central longitudinal axis A-A'. In various embodiments, an after-fan system 120 is located at an aft (or outlet) end of fan 42. After-fan system 120 may include an exit guide vane assembly 106 and an after-fan airflow expander turbine 122 located aft of the exit guide vane assembly 106.

After-fan airflow expander turbine 122 (referred to herein as after-fan turbine 122) may include one or more rotor assemblies (rotor stages) 124. Rotor assemblies 124 may each comprise a plurality of blades 126. Blades 126 may each be coupled to a disk, which may be configured to rotate about engine central longitudinal axis A-A'. The disk may be centered about the rotation axis of the gas turbine engine with the plurality of blades 126 attached to the disk and spaced apart in the circumferential direction. Fluid output from fan 42 may drive rotation of blades 126, thereby rotating after-fan turbine shaft 160. In various embodiments, after-fan turbine 122 may include multiple stages of rotating blades with one or more stages of stationary vanes axially interspersed between the stages of rotating blades. The flow output by after-fan turbine 122 may be provided to bypass flow-path B and to core flow-path C, with momentary reference to FIG. 1.

Exit guide vane assembly 106 may be located at the aft end of fan 42. Stated differently, exit guide vane assembly 106 may be located aft of the aft-most rotor assembly 102 of fan 42. Exit guide vane assembly 106 may comprise a plurality of exit guide vanes 108 circumferentially spaced about engine central longitudinal axis A-A'. Exit guide vanes 108 direct fluid entering after-fan airflow expander turbine 122. In various embodiments, exit guide vane assembly 106 may be a variable vane assembly. In this regard, in various embodiments, a stagger angle of one or more of exit guide vanes 108 may be changed to alter the flow distribution of fluid entering after-fan airflow expander turbine 122. In various embodiments, exit guide vane assembly 106 may be a non-variable vane assembly. In this regard, in various embodiments, the position of exit guide vanes 108 may be fixed such that the stagger angle of exit guide vanes 108 remains unchanged during operation and/or after installation.

In accordance with various embodiments, after-fan airflow expander turbine 122 is positioned axially between an outlet of exit guide vane assembly 106 and an inlet of LPC 44. In various embodiments, fan 42 and after-fan turbine 122 rotate in the same direction, however, counter-rotating systems may also be provided. In various embodiments, after-fan turbine 122 may include a ring splitter 128 located radially outward of the tips of blades 126. Ring splitter 128 may be, at least partially, supported by an array of struts 130. Struts 130 may extend between static structure 36 and nacelle 18.

In accordance with various embodiments, after-fan system 120 may include an electrical generator 150 operationally coupled to after-fan turbine 122. Electrical generator 150 is configured to generate current (e.g., alternating current (AC)), in response to rotation of after-fan turbine 122. After-fan turbine shaft 160 of after-fan system 120 interconnects after-fan turbine 122 and electrical generator 150. After-fan turbine shaft 160 may form a mechanical input of electrical generator 150.

After-fan system 120 further includes an electric motor 152 operationally coupled to electrical generator 150. Electric motor 152 may be configured to generate torque or other mechanical energy in response to an electrical signal (e.g., current) provided by electrical generator 150. Electric motor 152 is operationally coupled to fan 42. In accordance with various embodiments, electric motor 152 is configured to transfer torque to fan 42. In various embodiments, electric motor 152 may be rotationally coupled to fan 42 via gear assembly 48. In this regard, electric motor 152 may drive rotation of gear assembly 48, thereby causing rotation of fan 42. In various embodiments, electric motor 152 is mechanically (e.g., rotationally) coupled to gear assembly 48 via a motor shaft 166. Motor shaft 166 rotationally couples the output of electric motor 152 to the input of gear assembly 48. In this regard, motor shaft 166 transfers torque from electric motor 152 to gear assembly 48, thereby causing rotation of fan 42. In various embodiments, an input shaft 168 of fan 42 (referred to herein as fan input shaft 168) may be rotationally coupled to, and/or may form an output of, gear assembly 48. In this regard, gear assembly 48 drives rotation of (e.g., transfers torque to) fan input shaft 168. Rotation of fan input shaft 168 drives rotation of fan 42.

After-fan turbine 122 is configured to extract energy from the flow output by fan 42 and return energy to fan 42 through torque. In various embodiments, the aerodynamic loading of the blades 126 may be modified by varying the stagger angle of exit guide vanes 108. The stagger angle of each of the exit guide vanes 108 may be varied by pivoting the exit guide vanes 108 about a vane axis V. The exit guide vane assembly 106 modifies the airflow from the fan 42 such that an airflow entrance angle into the after-fan turbine 122 may be selectively adjusted to change the energy extracted therefrom, for example, to tend to maximize energy extraction at cruise and tend to minimize energy extraction at the top of climb and take-off thrust conditions.

In various embodiments, a controller 140 may be operationally coupled to exit guide vanes 108. Controller 140 may control actuation of exit guide vanes 108 via one or more actuator(s) 142. Actuator(s) 142 may comprise one or more electromechanical actuator(s) (EMAs). Controller 140 may be in operable communication with actuator(s) 142. Controller 140 may be configured to command actuator(s) 142 to rotate exit guide vanes 108 to a desired position (i.e., a desired stagger angle). Controller 140 may determine the desired position of each of the exit guide vanes 108 based on an RPM of after-fan turbine shaft 160, an RPM of fan input shaft 168, an aircraft attitude, an operating condition of gas turbine engine 20, a command from the cockpit (for example, a throttle position signal), an altitude measurement, a weather condition, and/or any other suitable operating or flight condition input. For example, controller 140 may command actuator(s) 142 to actuate exit guide vanes 108 to one position during a take-off operating condition and to a different position during a cruise operating condition. In accordance with various embodiments, controller 140 may pivot exit guide vanes 108 about a vane axis V based on at least one of the RPM of after-fan turbine shaft 160 or the RPM of fan input shaft 168.

While exit guide vane assembly 106 is described as a variable vane assembly, it is contemplated and understood that in various embodiments, exit guide vane assembly 106 may be a non-variable exit guide vane assembly. Stated differently, in various embodiments, exit guide vanes 108 may be stationary such that the stagger angle of exit guide vanes 108 is constant and/or may not be adjusted during operation. In various embodiments, controller 140 may control a rotation speed of after-fan turbine 122 by modifying the rotation speed of fan 42 as opposed to or in addition to controlling the rotation speed of after-fan turbine 122 by modifying the stagger angle of exit guide vanes 108. Controller 140 may be in operable communication with electrical generator 150 and with electric motor 152. As described in further detail below, controller 140 may be configured to determine a desired rotation speed of after-fan turbine 122 (e.g., a desired RPM of after-fan turbine shaft 160) and, in response to the determination, controller 140 may modify a rotation speed of fan input shaft 168, such that the flow output from fan 42 produces the desired the rotation speed of after-fan turbine 122.

Controller 140 may, for example, be a portion of a flight control computer, a portion of a Full Authority Digital Engine Control (FADEC), a stand-alone controller, or combinations thereof. In accordance with various embodiments, controller 140 may comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete gate or transistor logic, discrete hardware components, or any combination thereof. Controller 140 may include a memory 144. Memory 144 may store executable instructions and data to implement control logic of controller 140. Memory 144 may comprise a non-transitory, tangible computer-readable medium having instructions stored thereon that, in response to execution by the controller, cause the controller to perform various operations. The term "non-transitory" is to be understood to remove only propagating transitory signals per se from the claim scope and does not relinquish rights to all standard computer-readable media that are not only propagating transitory signals per se.

Figure 2B:
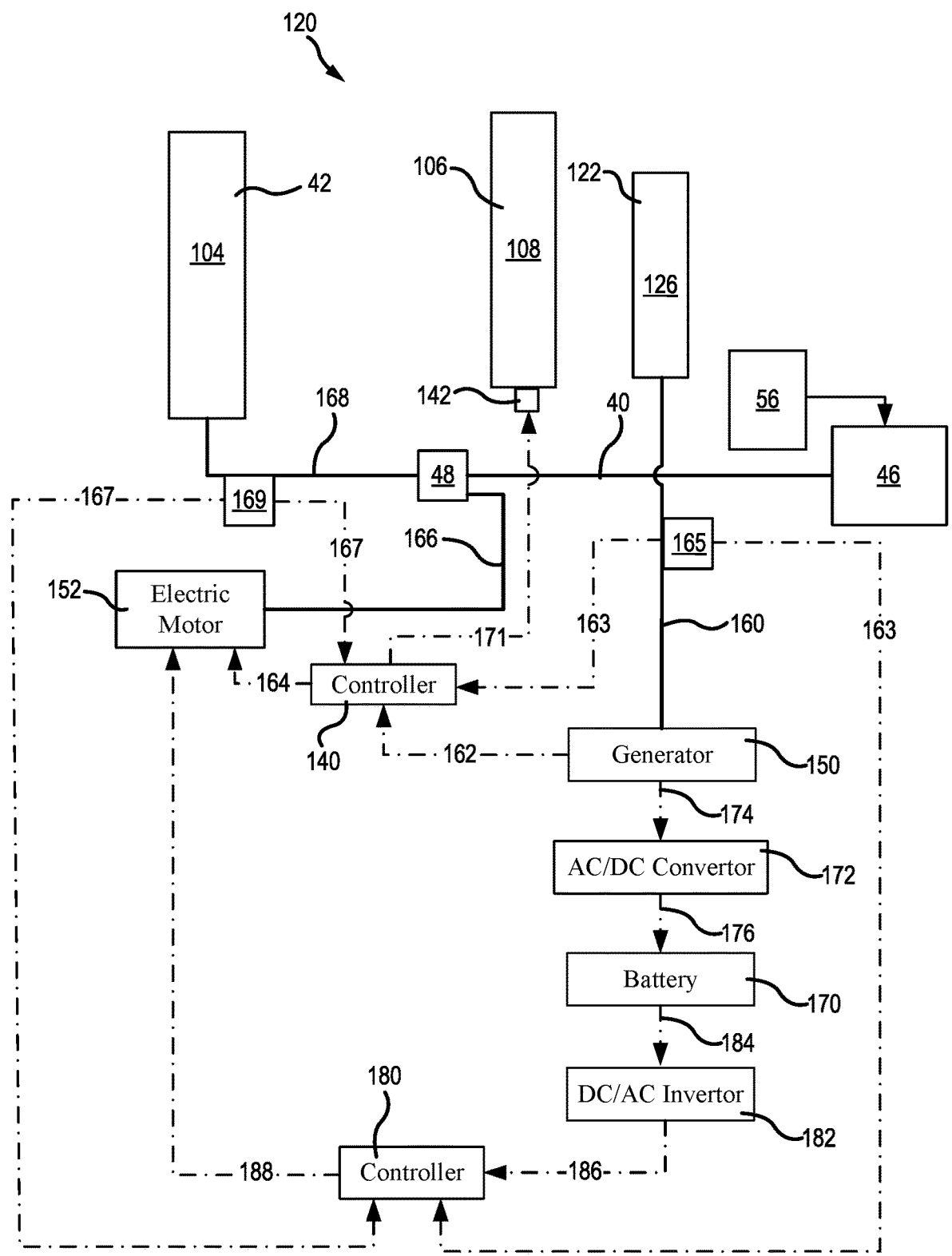
FIG. 2B illustrates a schematic of a gas turbine engine having an after-fan system with an electric motor rotationally coupled to a gear assembly, in accordance with various embodiments.

With reference to FIG. 2B, a schematic illustrating additional details of after-fan system 120 is provided. In accordance with various embodiments, after-fan shaft 160 may form a mechanical input of electrical generator 150. After-fan shaft 160 rotationally couples after-fan turbine 122 to the input of electrical generator 150. In this regard, after-fan shaft 160 transfers torque from after-fan turbine 122 to electrical generator 150. Electrical generator 150 is configured to generate electrical current 162 in response to torque generated by after-fan turbine 122 and transferred to electrical generator 150 via after-fan turbine shaft 160. In various embodiments, electrical generator 150 may comprise an AC generator with permanent magnet, an AC generator without permanent magnet, an AC self-oscillation rotary generator, or any other generator suitable for generating current in response to rotary motion.

Electrical current 162 output from electrical generator 150 may be provided to electric motor 152. In various embodiments, controller 140 may control the flow of electrical current 162 to electric motor 152. In this regards, controller 140 may output signals 164 (e.g., current) to electric motor 152. Signals 164 may be configured to control actuation of electric motor 152. Electric motor 152 may comprise an asynchronous 3-phase AC motor, an AC switch reluctance motor (SRM), a solenoid-driven actuator, a motor driven actuator, or any other suitable electrical actuator. In response to receiving signals 164, electric motor 152 may transfer torque to, for example, gear assembly 48, thereby causing rotation of fan 42. Signals 164 may be configured to control the mechanical output of electric motor 152. Signals 164 may be configured to cause electric motor 152 to increase, decrease, or maintain the rotational speed of the motor shaft 166. Controller 140 may determine whether to increase, decrease, or maintain the rotation speed of the motor shaft 166 (and thus the rotation speed of fan 42) based on signals 163 output from one or more sensors 165 operably coupled to after-fan turbine shaft 160 and/or based on signals 167 output from one or more sensors 169 operably coupled to fan input shaft 168. Sensors 165 may be configured to determine an RPM of after-fan turbine shaft 160. Sensors 169 may be configured to determine an RPM of fan input shaft 160. In embodiments comprising a variable vane exit guide assembly, controller 140 may output actuation signals 171 to actuator(s) 142 based on signals 165 and/or on signals 167.

In various embodiments, a portion of the electrical energy (e.g., current) generated by electrical generator 150 may be provided to one or more batteries 170. In various embodiments, an AC to direct current (DC) converter 172 may be located between electrical generator 150 and battery 170. AC/DC converter 172 may receive AC 174 output from electrical generator 150 and output DC 176 to battery 170. Battery 170 may provide power to various aircraft systems and/or systems of gas turbine engine 20.

In various embodiments, battery 170 may be electrically coupled to electric motor 152. In this regard, electrical energy from battery 170 may be provided to electric motor 152. In various embodiments, a controller 180 may control the flow of energy from battery 170 to electric motor 152. Controller 180 may be, for example, a portion of a flight control computer, a portion of a FADEC, a stand-alone controller, or combinations thereof. In various embodiments, controller 140 and controller 180 may be part of a single controller. In various embodiments, controller 180 may be distinct from controller 140. Controller 180 may comprise one or more processors configured to implement various logical operations in response to execution of instructions, for example, instructions stored on a non-transitory, tangible, computer-readable medium. The one or more processors can be a general purpose processor, a microprocessor, a microcontroller, a DSP, an ASIC, a FPGA or other programmable logic device, discrete gate or transistor logic, discrete hardware components, or any combination thereof.

Controller 180 is configured to control the flow of energy (e.g., current) to electric motor 152. In various embodiments, a DC/AC invertor 182 may be located between battery 170 and electric motor 152 and/or between battery 170 and controller 180. DC/AC invertor 182 is configured to receive DC 184 output from battery 170 and output AC 186. AC 186 may be provided to electric motor 152. In various embodiments, controller 180 may control the flow of AC 186 to electric motor 152. In this regard, controller 180 may output signals 188 (e.g., current) to electric motor 152. In various embodiments, AC 186 and/or signals 188 may be 3-phase AC. In various embodiments, electric motor 152 may comprise a SRM and AC 186 and/or signals 188 may be between 4-phase AC and 8-phase AC.

In response to receiving signals 188, electric motor 152 may transfer torque to, for example, gear assembly 48, thereby causing rotation of fan 42. Signals 188 may be configured to control the mechanical output of electric motor 152. Signals 188 may be configured to cause electric motor 152 to increase, decrease, or maintain the rotational speed of the motor shaft 166. Controller 180 may determine whether to increase, decrease, or maintain the rotation speed of the motor shaft 166 (and thus the rotation speed of fan 42) based on signals 163 output from sensor(s) 165 and/or based on signals 167 output from sensor(s) 169.

In accordance with various embodiments, fan 42 may be powered via LPT 46 and low speed shaft 40, and also, at least partially, powered by electrical generator 150, as well as by battery 170. Powering fan 42 electrically may increase efficiency and/or reduce fuel consumption.

Figure 2C:
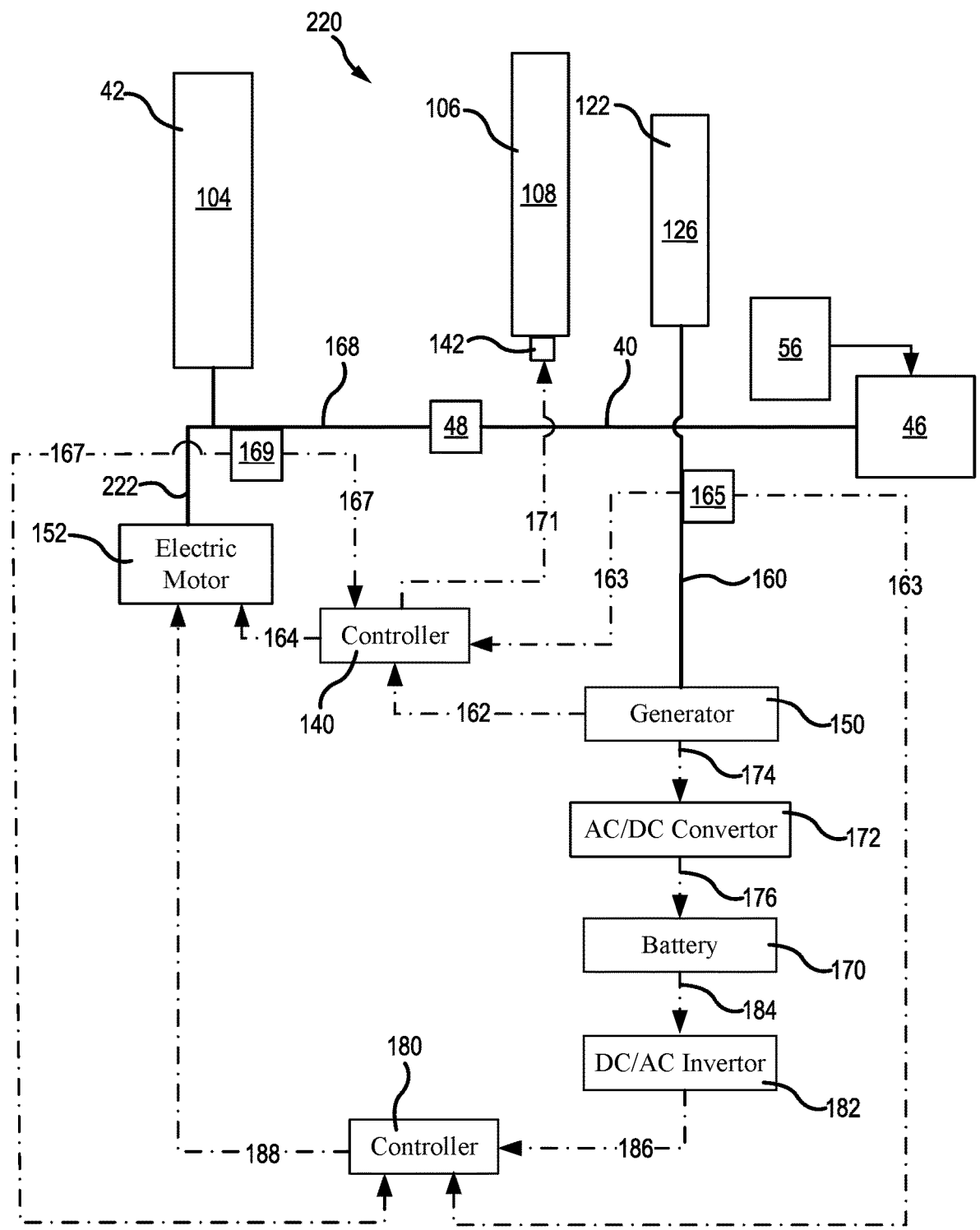
FIG. 2C illustrates a schematic of a gas turbine engine having an after-fan system with an electric motor bypassing a gear assembly, in accordance with various embodiments.

With reference to FIG. 2C, an after-fan system 220 is illustrated, in accordance with various embodiments. In various embodiments, gas turbine engine 20, with momentary reference to FIG. 2A, may include after-fan system 220 in place of after-fan system 120. After-fan system 220 is similar to after-fan system 120 in FIG. 2B. Elements with like element numbering, as depicted in FIG. 2B, are intended to be the same and will not necessarily be repeated for the sake of clarity. In accordance with various embodiments, electric motor 152 is directly coupled to fan input shaft 168 via a motor shaft 222. Stated differently, the mechanical output of electric motor 152 may transfer torque directly to the mechanical input of fan 42. Stated yet another way, the rotational coupling between electric motor 152 and fan 42 may bypass gear assembly 48. In accordance with various embodiments, controllers 140, 180 may be configured to control the RPM of motor shaft 222 such that fan 42 rotates at the desired speed, allowing shaft 222 to bypass gear assembly 48. Controllers 140, 180 control (e.g., increase, decrease, or maintain) the RPM of motor shaft 222 based on signals 163 from sensor(s) 165 and/or based on signals 167 from sensor(s) 169. In embodiments comprising a variable exit guide assembly, controller 140 may also send actuation signals 171 to actuator(s) 142 based on signals 165 and/or on signals 167.

Figure 3:
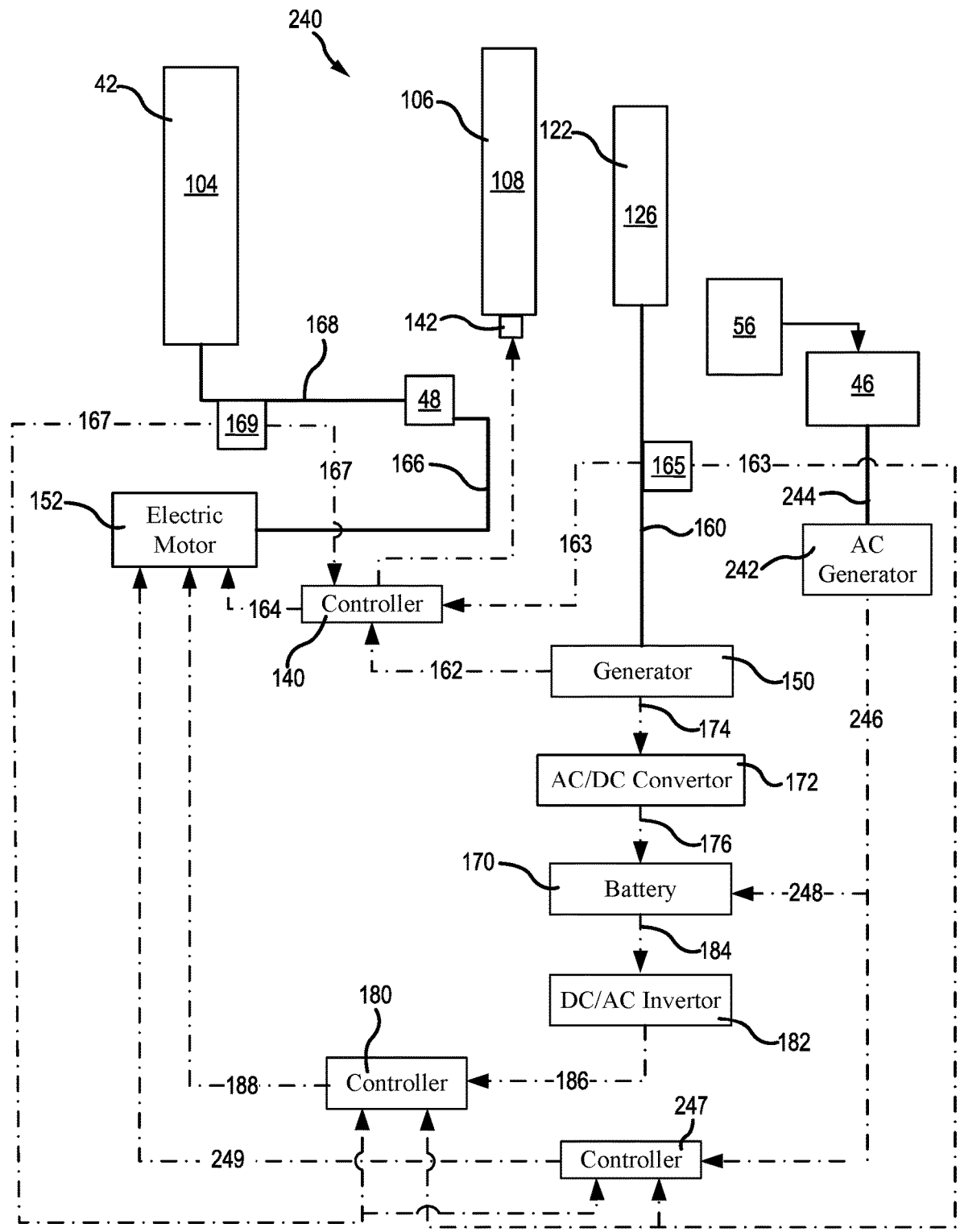
FIG. 3 illustrates a schematic of a gas turbine engine having an after-fan system with an electric motor operationally coupled to a lower pressure turbine, in accordance with various embodiments.

With reference to FIG. 3, an after-fan system 240 is illustrated, in accordance with various embodiments. In various embodiments, gas turbine engine 20, with momentary reference to FIG. 2A, may include after-fan system 240 in place of after-fan system 120. After-fan system 240 is similar to after-fan system 120 in FIG. 2B. Elements with like element numbering, as depicted in FIG. 2B, are intended to be the same and will not necessarily be repeated for the sake of clarity. In accordance with various embodiments, LPT 46 may be operationally coupled to an electrical generator 242. Electrical generator 242 may be configured to generate an electrical current (e.g., AC) in response to rotation of LPT 46. Rotation of LPT 46 may be driven by combustion gases output by combustor 56.

A shaft 244 may comprise a mechanical input of electrical generator 242. Shaft 244 rotationally couples LPT 46 to the input of electrical generator 242. In this regard, shaft 244 transfers torque from LPT 46 to electrical generator 242. Electrical generator 242 is configured to generate electrical current 246 in response to torque generated by LPT 46 and transferred to electrical generator 242 via shaft 244. In various embodiments, electrical generator 242 may comprise an AC generator with permanent magnet, an AC generator without permanent magnet, an AC self-oscillation rotary generator, or any other generator suitable for generating current in response to rotary motion. Electrical current 246 output from electrical generator 242 may be provided to electric motor 152. In various embodiments, a controller 247, similar to controller 180 in FIG. 2B, may control the flow of energy from AC generator 242 to electric motor 152. Controller 247 may be, for example, a portion of a flight control computer, a portion of a FADEC, a stand-alone controller, or combinations thereof. In various embodiments, controller 247 and controller 180 and/or controller 140 may be part of a single controller. In various embodiments, controllers 247, 140, 180 may be distinct from one another. Controller 247 may comprise one or more processors configured to implement various logical operations in response to execution of instructions, for example, instructions stored on a non-transitory, tangible, computer-readable medium. The one or more processors can be a general purpose processor, a microprocessor, a microcontroller, a DSP, an ASIC, a FPGA or other programmable logic device, discrete gate or transistor logic, discrete hardware components, or any combination thereof.

Controller 247 is configured to control the flow of energy (e.g., current) to electric motor 152. Controller 247 may output signals 249 (e.g., current) to electric motor 152. In response to receiving signals 249, electric motor 152 may transfer torque to, for example, gear assembly 48, thereby causing rotation of fan 42. Signals 249 may be configured to control the mechanical output of electric motor 152. Signals 249 may be configured to cause electric motor 152 to increase, decrease, or maintain the rotational speed of the motor shaft 166. Controller 247 may determine whether to increase, decrease, or maintain the rotation speed of the motor shaft 166 (and thus the rotation speed of fan 42) based on signals 163 output from sensor(s) 165 and/or based on signals 167 output from sensor(s) 169.

While FIG. 3 illustrates electric motor 152 as rotationally coupled to fan 42 via gear assembly 48, it is contemplated and understood that, in various embodiments, electric motor 152 of after-fan system 240 may be directly coupled to the input of fan 42 or otherwise configured to bypass gear assembly 48, similar to electric motor 152 in FIG. 2C. In various embodiments, a portion 248 of the energy output by electrical generator 242 may be provided to battery 170.

Figure 4:
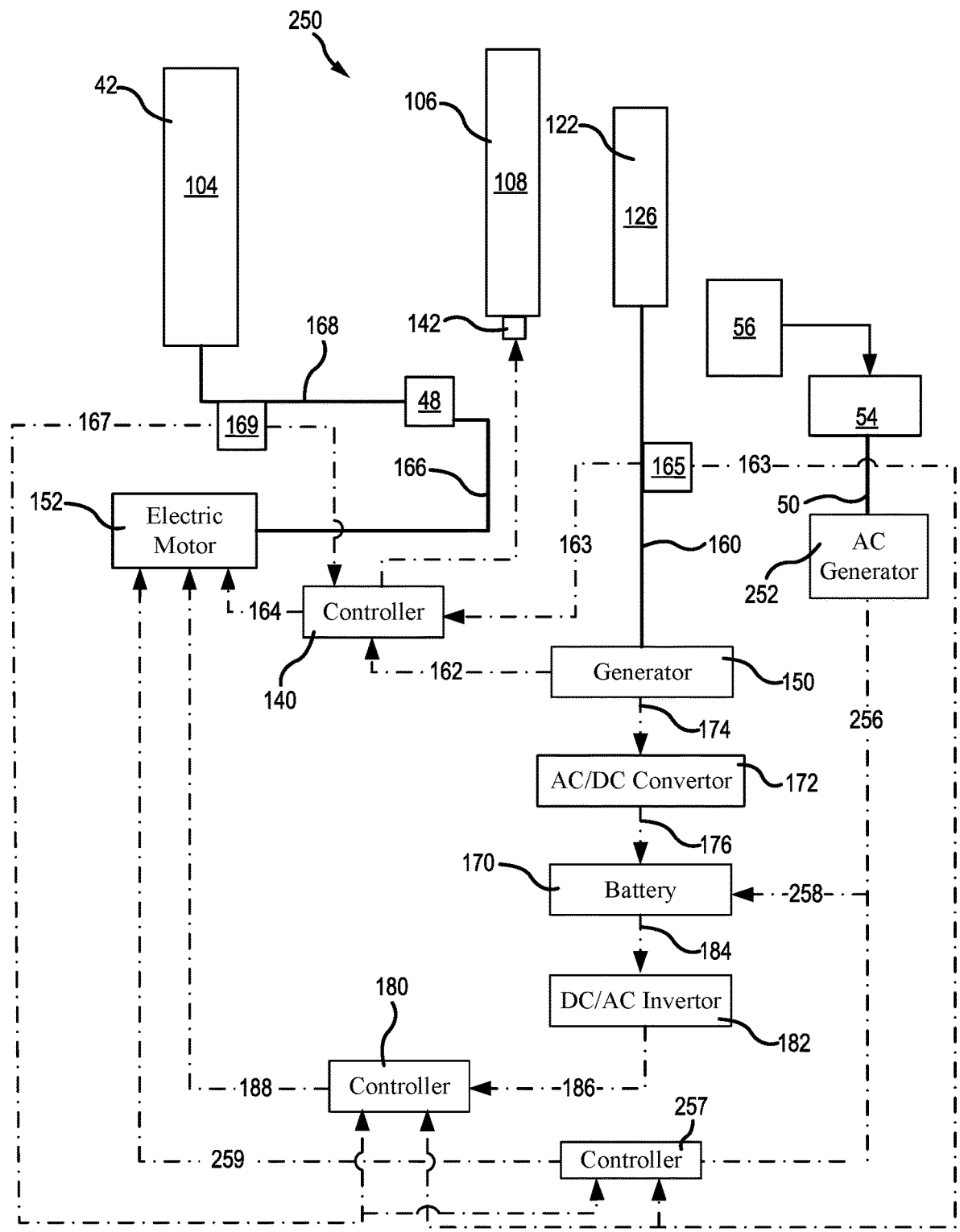
FIG. 4 illustrates a schematic of a gas turbine engine having an after-fan system with an electric motor operationally coupled to a high pressure turbine, in accordance with various embodiments.

With reference to FIG. 4, an after-fan system 250 is illustrated, in accordance with various embodiments. In various embodiments, a gas turbine engine, similar to gas turbine engine 20 in FIG. 2A, may include after-fan system 250 in place of after-fan system 120. After-fan system 250 is similar to after-fan system 120 in FIG. 2B. Elements with like element numbering, as depicted in FIG. 2B, are intended to be the same and will not necessarily be repeated for the sake of clarity. In accordance with various embodiments, HPT 54 may be operationally coupled to an electrical generator 252. Electrical generator 252 may be configured to generate an electrical current (e.g., AC) in response to rotation of HPT 54. Rotation of HPT 54 may be driven by combustion gases output by combustor 56.

A high speed shaft 50 may form a mechanical input of electrical generator 252. High speed shaft 50 rotationally couples HPT 54 to the input of electrical generator 252. In this regard, high speed shaft 50 transfers torque from HPT 54 to electrical generator 252. Electrical generator 252 is configured to generate electrical current 256 in response to torque generated by HPT 54. In various embodiments, electrical generator 252 may comprise an AC generator with permanent magnet, an AC generator without permanent magnet, an AC self-oscillation rotary generator, or any other generator suitable for generating current in response to rotary motion. Electrical current 256 output from electrical generator 252 may be provided to electric motor 152.

In various embodiments, a controller 257, similar to controller 180 in FIG. 2B, may control the flow of energy from AC generator 252 to electric motor 152. Controller 257 may be, for example, a portion of a flight control computer, a portion of a FADEC, a stand-alone controller, or combinations thereof. In various embodiments, controller 257 and controller 180 and/or controller 140 may be part of a single controller. In various embodiments, controllers 257, 140, 180 may be distinct from one another. Controller 257 may comprise one or more processors configured to implement various logical operations in response to execution of instructions, for example, instructions stored on a non-transitory, tangible, computer-readable medium. The one or more processors can be a general purpose processor, a microprocessor, a microcontroller, a DSP, an ASIC, a FPGA or other programmable logic device, discrete gate or transistor logic, discrete hardware components, or any combination thereof.

Controller 257 is configured to control the flow of energy (e.g., current) to electric motor 152. Controller 257 may output signals 259 (e.g., current) to electric motor 152. In response to receiving signals 259, electric motor 152 may transfer torque to, for example, gear assembly 48, thereby causing rotation of fan 42. Signals 259 may be configured to control the mechanical output of electric motor 152. Signals 259 may be configured to cause electric motor 152 to increase, decrease, or maintain the rotational speed of the motor shaft 166. Controller 257 may determine whether to increase, decrease, or maintain the rotation speed of the motor shaft 166 (and thus the rotation speed of fan 42) based on signals 163 output from sensor(s) 165 and/or based on signals 167 output from sensor(s) 169.

In various embodiments, a portion 258 of the energy output by electrical generator 252 may be provided to battery 170. While FIG. 4 illustrates electric motor 152 as rotationally coupled to fan 42 via gear assembly 48, it is contemplated and understood that, in various embodiments, electric motor 152 of after-fan system 250 may be directly coupled to the input of fan 42 or otherwise configured to bypass gear assembly 48, similar to electric motor 152 in FIG. 2C. In various embodiments, a gas turbine engine incorporating after-fan system 250 may include only HPT 54. In this regard, after-fan system 250 may allow LPT 46, with momentary reference to FIG. 1, to be removed from the gas turbine engine, thereby decreasing a size and/or weight of the engine.

Figure 5:
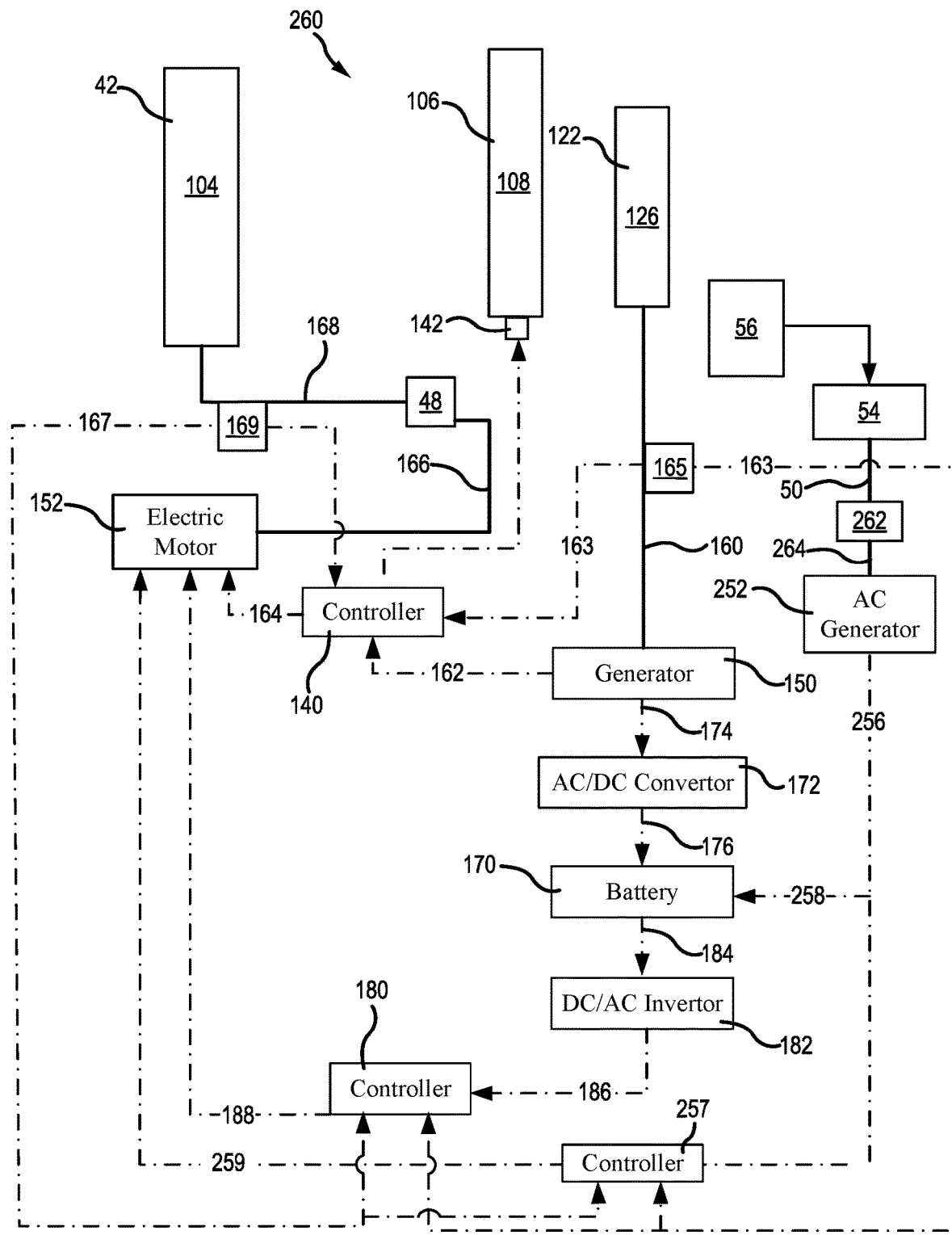
FIG. 5 illustrates a schematic of a gas turbine engine having an after-fan system with an electric motor operationally coupled to a high pressure turbine via a gear assembly, in accordance with various embodiments.

With reference to FIG. 5, an after-fan system 260 is illustrated, in accordance with various embodiments. In various embodiments, a gas turbine engine, similar to gas turbine engine 20 in FIG. 2A, may include after-fan system 260 in place of after-fan system 120. After-fan system 260 is similar to after-fan system 120 in FIG. 2B and after-fan system 250 in FIG. 4. Elements with like element numbering, as depicted in FIG. 2B and FIG. 4, are intended to be the same and will not necessarily be repeated for the sake of clarity. In accordance with various embodiments, a gear assembly 262 may be located between HPT 54 and electrical generator 252. High speed shaft 50 may form a mechanical input of gear assembly 262. A shaft 264 may form a mechanical output of gear assembly 262 and a mechanical input of electrical generator 252. High speed shaft 50 may be connected to electrical generator 252 through gear assembly 262 such that the input of electrical generator 252 can be driven at a lower speed (decreased RPM), as compared to high speed shaft 50. In various embodiments, a gas turbine engine incorporating after-fan system 250 may include only HPT 54. In this regard, after-fan system 260 may allow LPT 46, with momentary reference to FIG. 1, to be removed from the gas turbine engine, thereby decreasing a size and/or weight of the engine. While FIG. 5 illustrates electric motor 152 as rotationally coupled to fan 42 via gear assembly 48, it is contemplated and understood that, in various embodiments, electric motor 152 of after-fan system 260 may be directly coupled to the input of fan 42, or be otherwise configured to bypass gear assembly 48, similar to electric motor 152 in FIG. 2C.

Figure 6A:
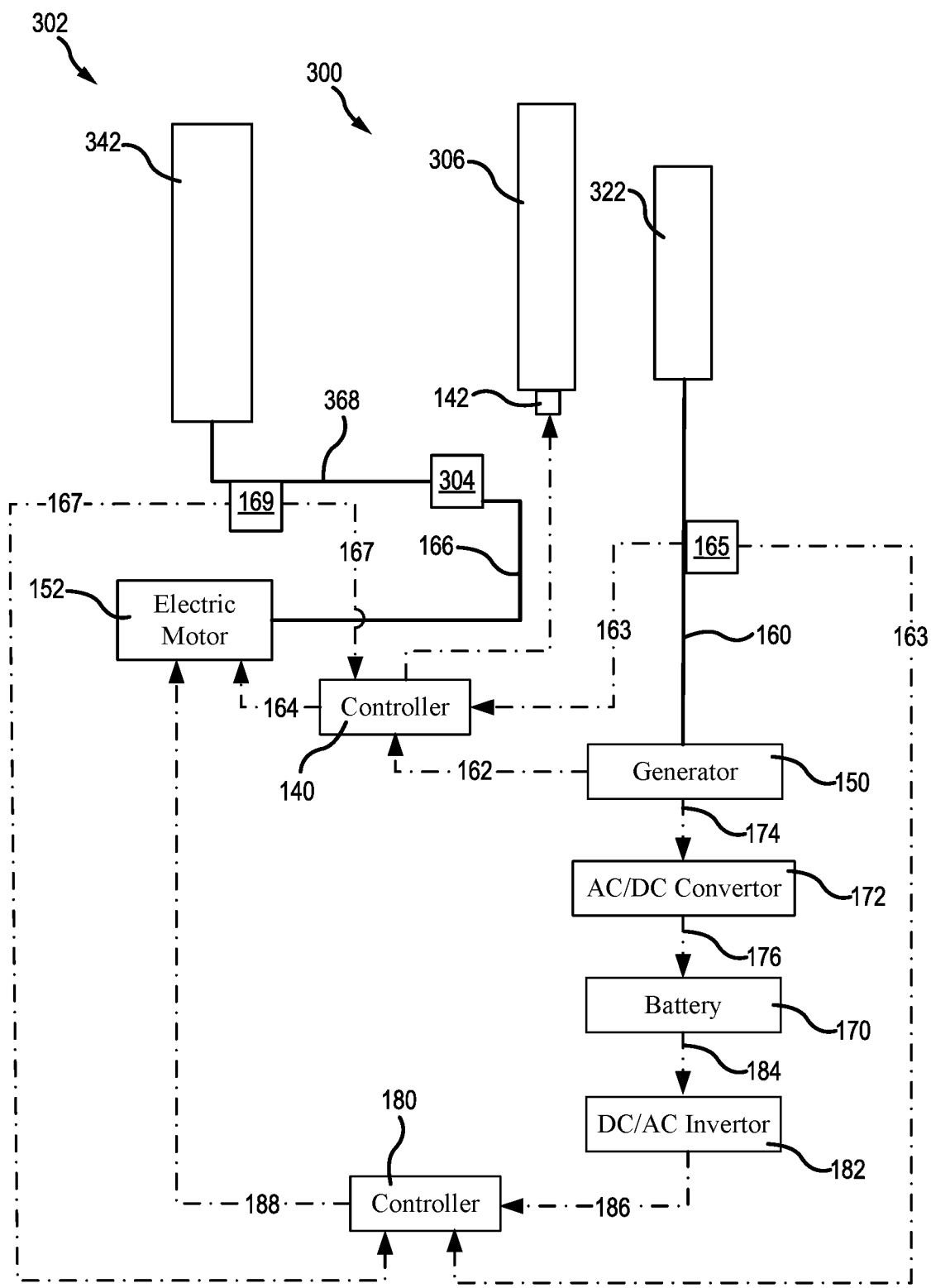
FIGS. 6A and 6B illustrate a electrical engine having an after-fan system with an electric motor, in accordance with various embodiments.

With reference to FIG. 6A, an after-fan system 300 for an electric engine is illustrated, in accordance with various embodiments. In various embodiments, after-fan system 300 may be incorporated into an electric engine 302 having a fan 342, an exit guide vane assembly 306, and an after-fan turbine 322, similar to fan 42, exit guide vane assembly 106, and after-fan turbine 122 in gas turbine engine 20 in FIG. 2A. Electric engine 302 may also include an inlet, airflow exit ducting, and/or a nozzle, similar to inlet 60, airflow exit ducting 62, and nozzle 64, respectively, of gas turbine engine 20 in FIG. 2A.

After-fan system 300 includes elements similar to after-fan system 120 in FIG. 2B. Accordingly, elements with like element numbering, as depicted in FIG. 2B, are intended to be the same and will not necessarily be repeated for the sake of clarity. In various embodiments, electric engine 302 is powered solely via electrical energy provided by after-fan turbine 122 and one or more batteries 170. In this regard, combustor section 26, compressor section 24, and turbine section 28 of gas turbine engine 20 may be eliminated from electric engine 302. In various embodiments, a gear assembly 304 may be located between electric motor 152 and fan 342. Shaft 166 may rotationally couple electric motor 152 to gear assembly 304. Shaft 166 is rotationally coupled to and/or may form a mechanical output of electric motor 152 and a mechanical input of gear assembly 304. Shaft 166 is configured to transfer torque from electric motor 152 to gear assembly 304, thereby causing rotation of fan 342. In various embodiments, an input shaft 368 of fan 342 (referred to herein as fan input shaft 368) may be rotationally coupled to, and/or may form an output of, gear assembly 304. Sensor(s) 169 may be operably coupled to fan input shaft 368. Sensor 169 may output signals 167, corresponding to an RPM of fan input shaft 368, to controller 140 and controller 180. Controllers 140, 180 are configured to control (e.g., increase, decrease, or maintain) the RPM of motor shaft 166 (and thus the rotational speed of fan 342) based on signals 163 from sensor(s) 165 and/or based on signals 167 from sensor(s) 169. In embodiments comprising a variable exit guide assembly, controller 140 may also send actuation signals 171 to actuator(s) 142 based on signals 165 and/or on signals 167.

Figure 6B:
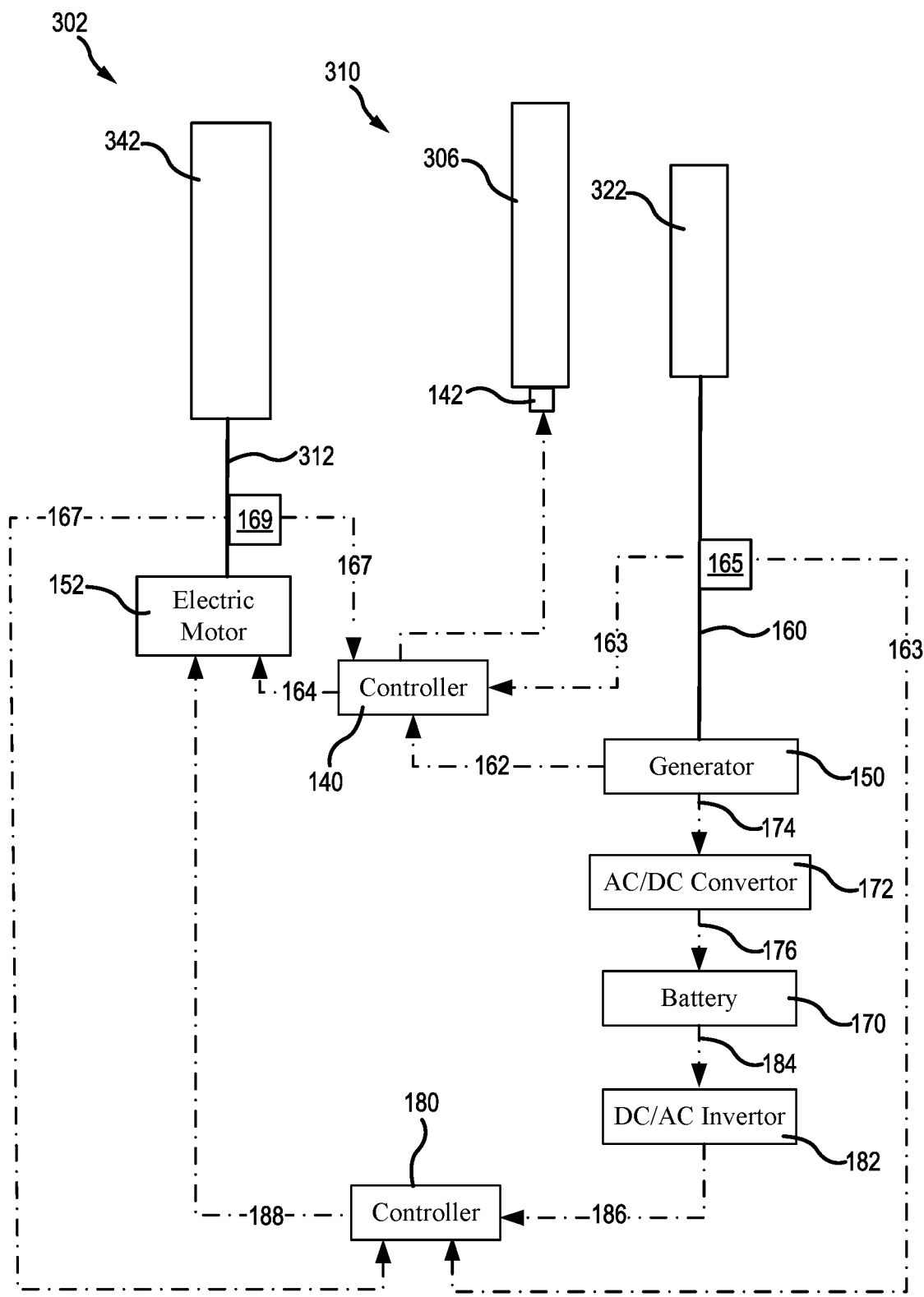

With reference to FIG. 6B, an after-fan system 310 for an electric engine is illustrated, in accordance with various embodiments. In various embodiments, after-fan system 310 may be incorporated into electric engine 302 in place of after-fan system 300. After-fan system 310 includes elements similar to after-fan system 120 in FIG. 2B and after-fan system 300 in FIG. 6A. Accordingly, elements with like element numbering, as depicted in FIG. 2B and FIG. 6A, are intended to be the same and will not necessarily be repeated for the sake of clarity. In accordance with various embodiments, electric motor 152 is directly coupled to fan 342 via, for example, a motor shaft 312. Motor shaft 312 is rotationally coupled to and/or may form a mechanical output of electric motor 152 and a mechanical input of fan 342. Motor shaft 312 is configured to transfer torque from electric motor 152 to fan 342, thereby causing rotation of fan 342. Sensor(s) 169 may be operably coupled to motor shaft 312. Sensor 169 may output signals 167, corresponding to an RPM of motor shaft 368, to controller 140 and controller 180. Controllers 140, 180 are configured to control (e.g., increase, decrease, or maintain) the RPM of motor shaft 312 (and thus the rotational speed of fan 342) based on signals 163 from sensor(s) 165 and/or based on signals 167 from sensor(s) 169. In embodiments comprising a variable exit guide assembly, controller 140 may also send actuation signals 171 to actuator(s) 142 based on signals 165 and/or on signals 167.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An after-fan system for a gas turbine engine, comprising:
    a fan driven by a low speed shaft via a gear assembly and a fan input shaft, the gear assembly rotationally coupled to the fan via the fan input shaft and configured to transfer torque from the low speed shaft to the fan;
    an after-fan turbine located forward of a compressor and aft of the fan, wherein a fluid output of the fan drives a rotation of the after-fan turbine thereby rotating an after-fan turbine shaft;
    an electrical generator mechanically coupled to the after-fan turbine via the after-fan turbine shaft at a location between the fan and the after-fan turbine and configured to generate an electrical current in response to rotation of the after-fan turbine shaft;
    an electric motor electrically coupled to the electrical generator at a location between the electric generator and the fan, the electric motor configured to drive a motor shaft; and
    the gear assembly rotationally coupled to a mechanical output of the electric motor via the motor shaft and configured to transfer torque from the motor shaft to the fan via the fan input shaft.

2. The after-fan system of claim 1, further comprising a battery electrically coupled to an output of the electrical generator.

3. The after-fan system of claim 2, wherein the battery is electrically coupled to the electric motor.

4. The after-fan system of claim 1, further comprising a controller electrically coupled to the electrical generator and the electric motor, wherein the controller is configured to receive the electrical current from the electrical generator and output an electrical signal to the electric motor, and wherein the electrical signal is configured to cause the electric motor to generate torque.

5. The after-fan system of claim 4, further comprising an exit guide vane assembly located at an inlet of the after-fan turbine.

6. The after-fan system of claim 5, wherein the exit guide vane assembly is a variable exit guide vane assembly, and wherein the controller is configured to control a stagger angle of the variable exit guide vane assembly.

7. The after-fan system of claim 1, wherein the electric motor comprises an asynchronous 3-phase alternating current motor or a switch reluctance motor.

8. A gas turbine engine, comprising:
- a fan driven by a low speed shaft via a gear assembly and a fan input shaft, the gear assembly rotationally coupled to the fan via the fan input shaft and configured to transfer torque from the low speed shaft to the fan;
- a compressor aft of the fan; and
- an after-fan system located axially between the fan and the compressor, the after-fan system comprising:
  - an after-fan turbine located forward of the compressor and aft of the fan, wherein a fluid output of the fan drives a rotation of the after-fan turbine thereby rotating an after-fan turbine shaft;
  - a first electrical generator mechanically coupled to the after-fan turbine via the after-fan turbine shaft at a location between the fan and the after-fan turbine and configured to generate a first electrical current in response to rotation of the after-fan turbine shaft;
  - an electric motor electrically coupled to the first electrical generator at a location between the electric generator and the fan, the electric motor configured to drive a motor shaft; and
  - the gear assembly rotationally coupled to a mechanical output of the electric motor via the motor shaft and configured to transfer torque from the motor shaft to the fan via the fan input shaft.

9. The gas turbine engine of claim 8, wherein the after-fan system further comprises an exit guide vane assembly located axially between the fan and the after-fan turbine.

10. The gas turbine engine of claim 9, further comprising:
- a turbine aft of the compressor; and
- the low speed shaft rotationally coupled to the turbine, wherein the gear assembly further couples the low speed shaft to the fan.

11. The gas turbine engine of claim 9, further comprising:
- a turbine aft of the compressor;
- the low speed shaft rotationally coupled to the turbine; and
- a second electrical generator operationally coupled to the low speed shaft and configured to generate a second electrical current in response to rotation of the turbine, wherein the second electrical generator is electrically coupled to the electric motor.

12. The gas turbine engine of claim 11, further comprising:
- the gear assembly rotationally coupled between the low-speed shaft and the second electrical generator, wherein the gear assembly is configured to transfer torque from the low speed shaft to the fan via the fan input shaft.

13. The gas turbine engine of claim 12, further comprising:
- a battery electrically coupled to the electric motor and to at least one of the first electrical generator or the second electrical generator.

14. The gas turbine engine of claim 8, wherein the electric motor comprises an asynchronous 3-phase alternating current motor or a switch reluctance motor.

15. The gas turbine engine of claim 14, wherein the first electrical generator comprises an alternating current self-oscillation rotary generator.

* * * * *